US012639993B2

(12) United States Patent
Lee et al.

(10) Patent No.: US 12,639,993 B2
(45) Date of Patent: May 26, 2026

(54) METHOD FOR VERIFYING ACCURACY OF VIRTUAL SENSOR MODEL FOR SIMULATION BASED ON REALITY INFORMATION DATA

(71) Applicant: Korea Electronics Technology Institute, Seongnam-si (KR)

(72) Inventors: Seonyoung Lee, Seoul (KR); Kyoung Won Min, Seongnam-si (KR); Haeng Seon Son, Seongnam-si (KR); Youngbo Shim, Seongnam-si (KR); Giho Sung, Seongnam-si (KR); Jin-Man Park, Gwangju-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 240 days.

(21) Appl. No.: 18/388,915

(22) Filed: Nov. 13, 2023

(65) Prior Publication Data

US 2024/0194005 A1 Jun. 13, 2024

(30) Foreign Application Priority Data

Dec. 13, 2022 (KR) ........................ 10-2022-0173316

(51) Int. Cl.
*G07C 5/06* (2006.01)
*B60W 60/00* (2020.01)

(52) U.S. Cl.
CPC .............. *G07C 5/06* (2013.01); *B60W 60/00* (2020.02)

(58) Field of Classification Search
CPC ......... G07C 5/06; B60W 60/00; B60W 50/02; B60W 40/02; B60W 60/001;
(Continued)

(56) References Cited

U.S. PATENT DOCUMENTS 12,007,487 B1 * 6/2024 Robinson ................ G01S 19/14
2004/0193372 A1 * 9/2004 MacNeille .............. G01S 19/05
342/357.42
(Continued)

FOREIGN PATENT DOCUMENTS

CN 114614934 A 6/2022
JP 2020-79073 A 5/2020

OTHER PUBLICATIONS

Extended European Search Report Issued on Apr. 29, 2024, in Counterpart European Patent Application No. 23209401.1 (8 Pages in English).
(Continued)

*Primary Examiner* — Tuan C To
*Assistant Examiner* — Dominick Mulder
(74) *Attorney, Agent, or Firm* — NSIP Law

(57) ABSTRACT

There is a method for verifying accuracy of a virtual sensor model for simulation based on reality information data. According to an embodiment, a virtual sensor verification method may acquire information on positions and states of real vehicles which are running on a real road, may acquire real sensor data generated in real sensors of a reality information acquisition vehicle from among the real vehicles, may reproduce the real vehicles on a virtual road as virtual vehicles, based on the acquired information on the positions and states, may acquire virtual sensor data outputted from virtual sensors mounted in a virtual information acquisition vehicle from among the virtual vehicles, and may verify the virtual sensors by comparing the acquired real sensor data and the virtual sensor data. Accordingly, accuracy of virtual sensor data which is supplied to a recognition, determination, control algorithm for autonomous driving may be measured and verified.

15 Claims, 3 Drawing Sheets

(58) Field of Classification Search

CPC . B60W 2050/0028; B60W 2050/0215; B60W 2050/041; B60W 2420/403; B60W 2420/408; B60W 2556/45; G06F 11/3698; G06F 11/3668; G06V 20/56; G06V 10/774; G05B 23/0237; G01S 7/4052; G01S 17/006; G01M 17/007

USPC ........................................................ 701/32.4

See application file for complete search history.

(56)                References Cited

U.S. PATENT DOCUMENTS

| | | | | |
|---|---|---|---|---|
| 2009/0043435 | A1* | 2/2009 | Kane | B61L 25/025 |
| | | | | 701/19 |
| 2011/0112739 | A1* | 5/2011 | O'Dea | G01C 21/165 |
| | | | | 342/357.35 |
| 2013/0173114 | A1* | 7/2013 | Pillai | B60W 10/18 |
| | | | | 701/41 |
| 2015/0269845 | A1* | 9/2015 | Calmettes | G08G 1/22 |
| | | | | 701/300 |
| 2016/0109551 | A1* | 4/2016 | Faragher | G01S 19/07 |
| | | | | 701/500 |
| 2016/0236683 | A1* | 8/2016 | Eggert | G01S 13/86 |
| 2018/0336297 | A1* | 11/2018 | Sun | G01M 17/00 |
| 2019/0130739 | A1* | 5/2019 | Khedkar | G08G 1/0965 |
| 2019/0152474 | A1 | 5/2019 | Sogabe | |
| 2020/0269880 | A1* | 8/2020 | Tokita | G08G 1/167 |
| 2021/0134248 | A1* | 5/2021 | Wan | G09G 5/12 |
| 2022/0204009 | A1 | 6/2022 | Choi et al. | |
| 2022/0284627 | A1* | 9/2022 | Johnson | H04N 17/002 |
| 2022/0374428 | A1 | 11/2022 | Nassar et al. | |
| 2023/0202507 | A1* | 6/2023 | Chu | G06V 20/20 |
| | | | | 701/23 |
| 2023/0316445 | A1* | 10/2023 | Mesde | G06F 16/2365 |
| | | | | 705/325 |

OTHER PUBLICATIONS

Korean Office Action issued on May 1, 2025, in corresponding Korean Patent Application No. 10-2022-0173316. (3pages in English, 5pages in Korean).

Japanese Office Action Issued on Oct. 18, 2024, in Counterpart Japanese Patent Application No. 2023-186429 (4 Pages in English, 8 Pages in Japanese).

* cited by examiner

1

METHOD FOR VERIFYING ACCURACY OF VIRTUAL SENSOR MODEL FOR SIMULATION BASED ON REALITY INFORMATION DATA

CROSS-REFERENCE TO RELATED APPLICATION(S) AND CLAIM OF PRIORITY

This application is based on and claims priority under 35 U.S.C. § 119 to Korean Patent Application No. 10-2022-0173316, filed on Dec. 13, 2022, in the Korean Intellectual Property Office, the disclosure of which is herein incorporated by reference in its entirety.

BACKGROUND

Field

The disclosure relates to an autonomous driving simulation, and more particularly, to a method for verifying accuracy of a virtual sensor model which is used for verifying an autonomous driving algorithm in a virtual road environment by using a simulator.

Description of Related Art

An autonomous vehicle may have a sensor mounted therein to perform recognition, determination, and control, and may sense surroundings of the ego vehicle and may identify information of omnidirectional objects. In particular, an autonomous vehicle may recognize its surroundings, such as objects around the vehicle, a drivable region on a road, a traffic signal state, etc., from sensor data of a camera, a LiDAR, a RADAR, etc. mounted therein, may determine a moving direction of a neighboring object, a current drivable status, etc., and may control a movement of the ego vehicle.

In order to verify an autonomous driving algorithm mounted in an autonomous vehicle, a simulator-based method may be used in parallel with real vehicle-based verification for rapid and effective verification. Various sensor data required to perform operations of a recognition, determination, and control algorithm mounted in an autonomous vehicle may be generated by modeling and simulating a virtual sensor, and may be provided to the algorithm. Accordingly, it is very important to maintain accuracy of an output value of a virtual sensor model which is used in an autonomous driving simulator for accurate operations of an algorithm.

SUMMARY

The disclosure has been developed in order to solve the above-described problems, and an object of the disclosure is to provide a method for measuring and verifying accuracy of virtual sensor data which is supplied to a recognition, determination, control algorithm for autonomous driving when autonomous driving software mounted in an autonomous vehicle is verified based on a simulator.

According to an embodiment of the disclosure to achieve the above-described object, a virtual sensor verification method may include: acquiring information on positions and states of real vehicles which are running on a real road; acquiring real sensor data generated in real sensors of a reality information acquisition vehicle from among the real vehicles; reproducing the real vehicles on a virtual road as virtual vehicles, based on the acquired information on the positions and states; acquiring virtual sensor data outputted from virtual sensors mounted in a virtual information acquisition vehicle from among the virtual vehicles; and verifying the virtual sensors by comparing the acquired real sensor data and the virtual sensor data.

The virtual sensors may be virtual sensors that simulate types and specifications of the real sensors.

The real sensors may include a real camera, a real LiDAR, and a real RADAR, and the virtual sensors may include a virtual camera, a virtual LiDAR, and a virtual RADAR.

The information on the positions and states of the real vehicles may be acquired from GNSS/INS mounted in the real vehicles.

The GNSS/INS mounted in the real vehicles may be synchronized with reference to a GPS time of GNSS/INS mounted in the reality information acquisition vehicle.

A difference between a GPS time of the reality information acquisition vehicle and a GPS time of a target vehicle may be calculated by the following equation:

$$t_{offset} = t_{gps1}^{equip1} + \left( t_{gps1}^{gps} - t_{gps2}^{gps} \right) - t_{gps2}^{equip2}$$

where $t_{offset}$ is a GPS time difference, $$t_{gps1}^{equip1}$$

is a GPS time data processing delay time at acquisition equipment of the reality information acquisition vehicle, $$t_{gps2}^{equip2}$$

is a GPS time data processing delay time at acquisition equipment of the target vehicle, $$t_{gps1}^{gps}$$

is a GPS reception delay time at acquisition equipment of the reality information acquisition vehicle, and $$t_{gps2}^{gps}$$

is a GPS reception delay time at acquisition equipment of the target vehicle.

The real sensor data of the reality information acquisition vehicle may be synchronized with reference to a GPS time of the reality information acquisition vehicle.

The virtual road may be a road that simulates a real road in a virtual space.

A simulator may be a tool for testing an autonomous driving algorithm through the reality information acquisition vehicle.

According to another aspect of the disclosure, a virtual sensor verification system may include: a synchronization module configured to acquire information on positions and states of real vehicles which are running on a real road, and to acquire real sensor data generated in real sensors of a reality information acquisition vehicle from among the real vehicles; a simulation module configured to reproduce the real vehicles on a virtual road as virtual vehicles, based on the acquired information on the positions and states; and a verification module configured to acquire virtual sensor data outputted from virtual sensors mounted in a virtual information acquisition vehicle from among the virtual vehicles, and to verify the virtual sensors by comparing the acquired real sensor data and the virtual sensor data.

According to still another aspect of the disclosure, a virtual sensor verification method may include: reproducing real vehicles on a virtual road as virtual vehicles, based on information on positions and states which is acquired from real vehicles running on a real road; acquiring virtual sensor data outputted from virtual sensors mounted in a virtual information acquisition vehicle from among the virtual vehicles; and verifying the virtual sensors by comparing the acquired virtual sensor data and real sensor data which is acquired by real sensors of a reality information acquisition vehicle among the real vehicles.

According to yet another aspect of the disclosure, a virtual sensor verification system may include: a simulation module configured to reproduce real vehicles on a virtual road as virtual vehicles, based on information on positions and states which is acquired from real vehicles running on a real road; and a verification module configured to acquire virtual sensor data outputted from virtual sensors mounted in a virtual information acquisition vehicle from among the virtual vehicles, and to verify the virtual sensors by comparing the acquired virtual sensor data and real sensor data which is acquired by real sensors of a reality information acquisition vehicle among the real vehicles.

According to embodiments of the disclosure as described above, accuracy of virtual sensor data which is supplied to a recognition, determination, control algorithm for autonomous driving may be measured and verified, so that accuracy on a result of verifying based on a simulator of an autonomous driving algorithm may be enhanced.

According to embodiments of the disclosure, it is possible to verify autonomous driving software based on a scenario of various environments and conditions, so that algorithms may be rapidly developed and stability of algorithms may be enhanced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

An embodiment of the disclosure proposes a method for verifying accuracy of a virtual sensor model for simulation based on reality information data. The disclosure relates to a technology for measuring and verifying accuracy of a virtual sensor model which is used for verifying an autonomous driving algorithm in a virtual road environment using a simulator.

Figure 1:
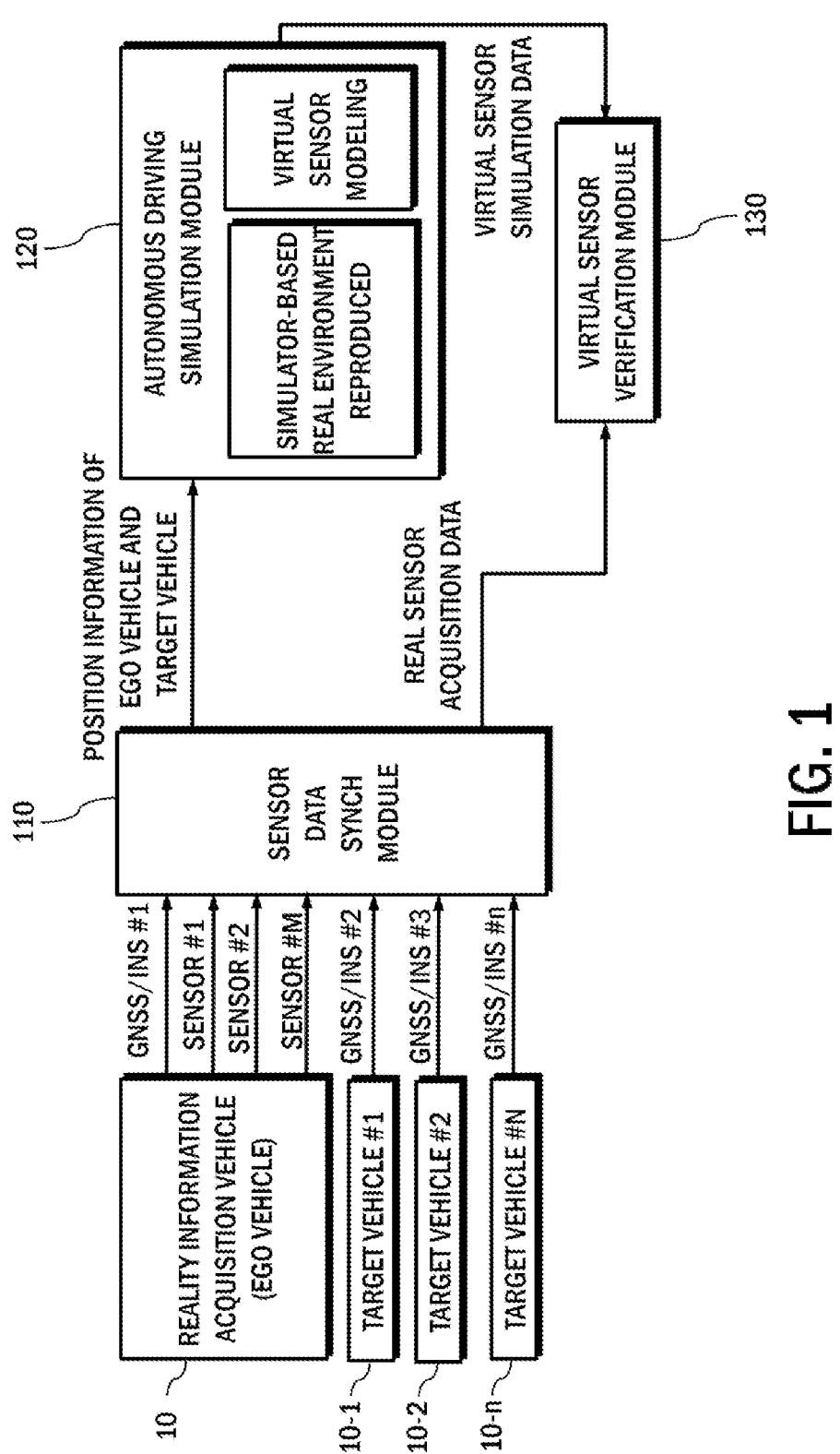
FIG. 1 is a view illustrating a configuration of a virtual sensor model verification system according to an embodiment of the disclosure.

FIG. 1 is a view illustrating a configuration of a virtual sensor model verification system according to an embodiment of the disclosure. The virtual sensor model verification system according to an embodiment may include a sensor data synchronization module 110, an autonomous driving simulation module 120, a virtual sensor verification module 130 as shown in FIG. 1.

The sensor data synchronization module 110 may receive data from real vehicles 10, 10-1, 10-2, . . . , 10-n that are running on a real road, and may synchronize data. The real vehicles 10, 10-1, 10-2, . . . , 10-n may be divided into a reality information acquisition vehicle 10 and target vehicles 10-1, 10-2, . . . , 10-n.

The reality information acquisition vehicle 10 is an ego vehicle which is an object for generating real sensor data, and the target vehicles 10-1, 10-2, . . . , 10-n refer to vehicles thar are running around the reality information acquisition vehicle 10.

Data collected from the reality information acquisition vehicle 10 may include global navigation satellite system (GNSS)/inertial navigation system (INS) data and real sensor data. On the other hand, the target vehicles 10-1, 10-2, . . . , 10-n provide only GNSS/INS data.

The GNSS/INS data may contain information on positions and states (positions, direction, speeds of vehicles, etc.) of the real vehicles 10, 10-1, 10-2, . . . , 10-n. Real sensors installed in the reality information acquisition vehicle 10 may include a camera, a LiDAR, a RADAR, and may further include other types of sensors.

Accordingly, the sensor data synchronization module 110 may receive GNSS/INS data and real sensor data from the reality information acquisition vehicle 10, and may receive GNSS/INS data from the target vehicles 10-1, 10-2, . . . , 10-n, and may synchronize the received data. A method for synchronizing by the sensor data synchronization module 110 will be described in detail below with reference to FIG. 3.

The autonomous driving simulation module 120 may reproduce the real vehicles 10, 10-1, 10-2, . . . , 10-n on a virtual road as virtual vehicles, based on information on positions and states of the real vehicles 10, 10-1, 10-2, . . . , 10-n which is recorded on the GNSS/INS data transmitted through the sensor data synchronization module 110.

5

An autonomous driving simulation is a tool for testing an autonomous driving algorithm in a virtual environment through a virtual vehicle. The virtual road is a road in a virtual space, which simulates a real road.

A virtual information acquisition vehicle which is a virtual vehicle corresponding to the reality information acquisition vehicle 10 among the virtual vehicles may have virtual sensor models mounted therein. The virtual sensor models are virtual sensors that simulate real sensors installed in the reality information acquisition vehicle 10 to be of the same type and to have the same specification.

The virtual sensor verification module 130 may verify accuracy of a virtual sensor model mounted in the virtual information acquisition vehicle by comparing real sensor data and virtual sensor data. Real sensor data may be acquired from the reality information acquisition vehicle 10 through the sensor data synchronization module 110, and virtual sensor data may be acquired from the autonomous driving simulation module 120.

Figure 2:
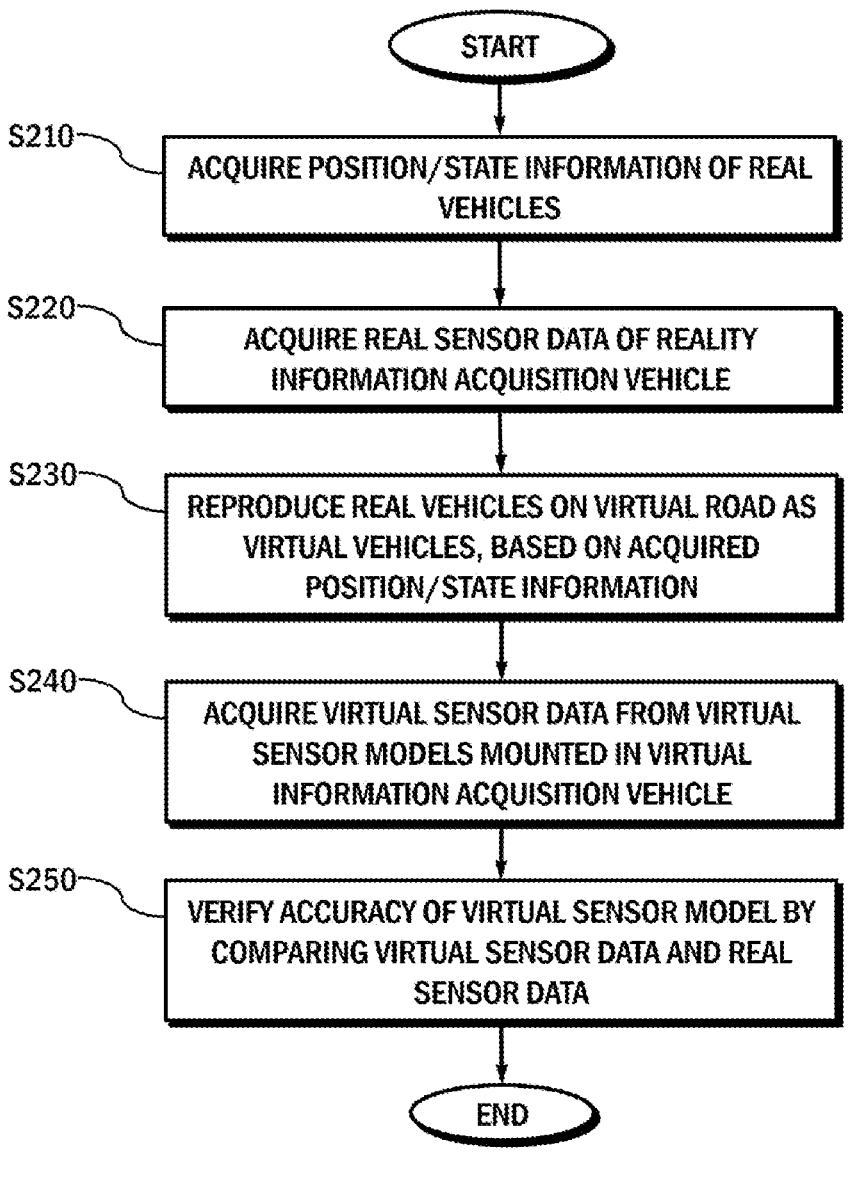
FIG. 2 is a flowchart provided to explain a virtual sensor model verification method according to another embodiment of the disclosure.

FIG. 2 is a flowchart provided to explain a virtual sensor model verification method according to another embodiment.

In order to verify a virtual sensor model, the sensor data synchronization module 110 may acquire information on positions and states of the real vehicles 10, 10-1, 10-2, . . . , 10-n running on a real road (S210), first, and may acquire real sensor data from the reality information acquisition vehicle 10 (S220).

The autonomous driving simulation module 120 may reproduce the real vehicles 10, 10-1, 10-2, . . . , 10-n on a virtual road as virtual vehicles, based on the information on the positions and states acquired at step S210 (S230).

The virtual sensor verification module 130 may acquire virtual sensor data from a virtual sensor model mounted in a virtual information acquisition vehicle, which corresponds to the reality information acquisition vehicle 10 (S240), and may verify accuracy of the virtual sensor model by comparing the acquired virtual sensor data with the real sensor data which is acquired at step S220 (S250).

Hereinafter, a method for synchronizing by the sensor data synchronization module 110 described above will be described in detail.

Data synchronization may be required to implement a virtual environment based on data acquired from the reality information acquisition vehicle 10 and the target vehicles 10-1, 10-1, . . . , 10-n. A method for synchronizing data acquired from different real vehicles is illustrated in FIG. 3.

Figure 3:
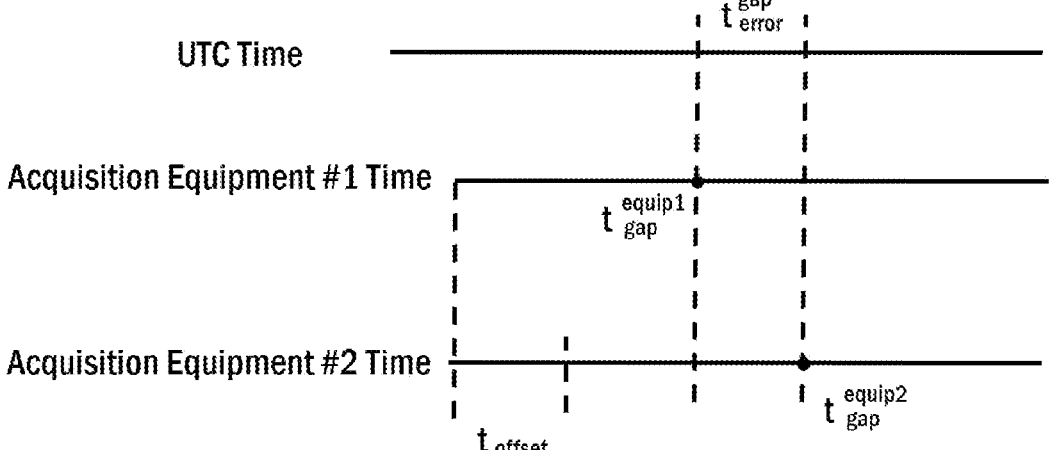
FIG. 3 is a view illustrating a method of synchronizing data acquired from real vehicles.

It is assumed that GNSS/INS data of a neighboring target vehicle are acquired with reference to a GPS time of the reality information acquisition vehicle 10 as shown in FIG. 3. There is a high possibility that a time at which GNSS/INS data is acquired from the reality information acquisition vehicle 10 and a time at which GNSS/INS data is acquired from the neighboring target vehicle differ from each other. In addition, there may be a difference in time of starting to acquire GNSS/INS data, and accordingly, a process of synchronizing data with reference to the reality information acquisition vehicle 10, which is an ego vehicle, is required.

FIG. 3 illustrates an example of GNSS/INS data which is acquired by data acquisition equipment mounted in the reality information acquisition vehicle 10 and data acquisition equipment mounted in the neighboring target vehicle. In order to compare by UTC time, time information of each piece of data acquisition equipment may be acquired, and GPS time data may be acquired.

A method of calculating $t_{offset}$ to extract accurate comparison data by synchronizing sensor data acquired from different pieces of equipment is based on the following equation:

$$t_{offset} = t_{gps1}^{equip1} + \left(t_{gps1}^{gps} - t_{gps2}^{gps}\right) - t_{gps2}^{equip2} = t_{gps2}^{equip1} - t_{gps2}^{equip2}$$

In the above equation, data $$t_{gps1}^{equip1}, t_{gps2}^{equip2}$$

that have a small time difference are extracted from GPS data which is acquired by acquisition equipment #1 [acquisition equipment of the reality information acquisition vehicle 10] and acquisition equipment #2 [acquisition equipment of the target vehicle 10-1, 10-2, . . . , 10-n].

$$t_{gps1}^{equip1}$$

is a delay time resulting from GPS time data processing at acquisition equipment #1, and $$t_{gps2}^{equip2}$$

is a delay time resulting from GPS time data processing at acquisition equipment #2.

In addition, $$t_{gps1}^{gps}$$

refers to a GPS reception delay time at acquisition equipment #1, and $$t_{gps2}^{gps}$$

refers to a GPS reception delay time at acquisition equipment #2.

$$t_{gps1}^{gps} - t_{gps2}^{gps} \text{ equals } t_{error}^{gps} \text{ and } t_{gps2}^{equip1}$$

may be estimated by adding $$t_{error}^{gps} \text{ to } t_{gps1}^{equip1}.$$

Accordingly, $t_{offset}$ refers to a GPS time difference between acquisition equipment #1 and acquisition equipment #2.

Real sensor data of the reality information acquisition vehicle 10 may be synchronized with reference to a GPS time of the reality information acquisition vehicle 10.

Up to now, a method for verifying accuracy of a virtual sensor model for a simulation based on reality information data has been described with reference to preferred embodiments.

The above-described embodiments propose a method for measuring and verifying accuracy of virtual sensor data to be supplied to a recognition, determination, control algorithm for autonomous driving when autonomous driving software mounted in an autonomous vehicle is verified based on a simulator.

Accordingly, it is expected that accuracy on a result of verifying based on a simulator of an autonomous driving algorithm and a recognition, determination, control algorithm mounted in an autonomous vehicle is enhanced, and it is possible to verify autonomous driving software based on a scenario of various environments and conditions, so that algorithms may be rapidly developed and stability of algorithms may be enhanced.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A virtual sensor verification method comprising:
acquiring information on positions and states of real vehicles which are running on a real road, wherein the real vehicles includes a reality information acquisition vehicle and other vehicles, and wherein GNSS/INS mounted in the other vehicles of the real vehicles are synchronized with reference to a GPS time of GNSS/INS mounted in the reality information acquisition vehicle of the real vehicles and a result of the synchronizing is used in the acquiring the information on the positions and states of the real vehicles;
acquiring real sensor data generated in real sensors of the reality information acquisition vehicle from among the real vehicles, the real sensor data being synchronized with reference to the GPS time of the GNSS/INS mounted in the reality information acquisition vehicle;
reproducing the real vehicles on a virtual road as virtual vehicles, based on the acquired information on the positions and states determined from the GPS-time-synchronized GNSS/INS of the real vehicles;
acquiring virtual sensor data outputted from virtual sensors mounted in a virtual information acquisition vehicle from among the virtual vehicles; and
verifying the virtual sensors by comparing the acquired real sensor data and the virtual sensor data.

2. The virtual sensor verification method of claim 1, wherein the virtual sensors are virtual sensors that simulate types and specifications of the real sensors.

3. The virtual sensor verification method of claim 1, wherein the real sensors comprise a real camera, a real LiDAR, and a real RADAR, and
wherein the virtual sensors comprise a virtual camera, a virtual LiDAR, and a virtual RADAR.

4. The virtual sensor verification method of claim 1, wherein the information on the positions and states of the real vehicles are acquired from the GNSS/INS mounted in the real vehicles.

5. The virtual sensor verification method of claim 1, wherein a difference between the GPS time of the reality information acquisition vehicle and a GPS time of a target vehicle is calculated by the following equation:

$$t_{offset} = t_{gps1}^{equip1} + \left(t_{gps1}^{gps} - t_{gps2}^{gps}\right) - t_{gps2}^{equip2}$$

where $t_{offset}$ is a GPS time difference, $$t_{gps1}^{equip1}$$

is a GPS time data processing delay time at acquisition equipment of the reality information acquisition vehicle, $$t_{gps2}^{equip2}$$

is a GPS time data processing delay time at acquisition equipment of the target vehicle, $$t_{gps1}^{gps}$$

is a GPS reception delay time at acquisition equipment of the reality information acquisition vehicle, and $$t_{gps2}^{gps}$$

is a GPS reception delay time at acquisition equipment of the target vehicle.

6. The virtual sensor verification method of claim 1, wherein the virtual road is a road that simulates a real road in a virtual space.

7. The virtual sensor verification method of claim 1, wherein a simulator is a tool for testing an autonomous driving algorithm through the reality information acquisition vehicle.

8. A virtual sensor verification system comprising:
a processor configured to acquire information on positions and states of real vehicles which are running on a real road, wherein the real vehicles includes a reality information acquisition vehicle and other vehicles, and wherein GNSS/INS mounted in the other vehicles of the real vehicles are synchronized with reference to a GPS time of GNSS/INS mounted in the reality information acquisition vehicle of the real vehicles, and a result of the synchronizing is used in the acquiring the information on the positions and states of the real vehicles, and to acquire real sensor data generated in real sensors of the reality information acquisition vehicle from among the real vehicles, the real sensor data being synchronized with reference to the GPS time of the GNSS/INS mounted in the reality information acquisition vehicle;

a simulation processor configured to reproduce the real vehicles on a virtual road as virtual vehicles, based on the acquired information on the positions and states determined from the GPS-time-synchronized GNSS/INS of the real vehicles; and a verification processor configured to acquire virtual sensor data outputted from virtual sensors mounted in a virtual information acquisition vehicle from among the virtual vehicles, and to verify the virtual sensors by comparing the acquired real sensor data and the virtual sensor data.

9. A virtual sensor verification method comprising:

reproducing real vehicles on a virtual road as virtual vehicles, based on information on positions and states which is acquired from real vehicles running on a real road, wherein the real vehicles includes a reality information acquisition vehicle and other vehicles, and wherein GNSS/INS mounted in the other vehicles of the real vehicles are synchronized with reference to a GPS time of GNSS/INS mounted in the reality information acquisition vehicle of the real vehicles, and a result of the synchronizing is used in the acquiring the information on the positions and states of the real vehicles;

acquiring virtual sensor data outputted from virtual sensors mounted in a virtual information acquisition vehicle from among the virtual vehicles, the real sensor data being synchronized with reference to the GPS time of the GNSS/INS mounted in the reality information acquisition vehicle; and verifying the virtual sensors by comparing the acquired virtual sensor data and real sensor data which is acquired by real sensors of the reality information acquisition vehicle among the real vehicles.

10. The virtual sensor verification system of claim 8, wherein the virtual sensors are virtual sensors that simulate types and specifications of the real sensors.

11. The virtual sensor verification system of claim 8, wherein the real sensors comprise a real camera, a real LiDAR, and a real RADAR, and wherein the virtual sensors comprise a virtual camera, a virtual LiDAR, and a virtual RADAR.

12. The virtual sensor verification system of claim 8, wherein the information on the positions and states of the real vehicles are acquired from the GNSS/INS mounted in the real vehicles.

13. The virtual sensor verification system of claim 8, wherein a difference between the GPS time of the reality information acquisition vehicle and a GPS time of a target vehicle is calculated by the following equation:

$$t_{offset} = t_{gps1}^{equip1} + \left(t_{gps1}^{gps} - t_{gps2}^{gps}\right) - t_{gps2}^{equip2}$$

where $t_{offset}$ is a GPS time difference, $$t_{gps1}^{equip1}$$

is a GPS time data processing delay time at acquisition equipment of the reality information acquisition vehicle, $$t_{gps2}^{equip2}$$

is a GPS time data processing delay time at acquisition equipment of the target vehicle, $$t_{gps1}^{gps}$$

is a GPS reception delay time at acquisition equipment of the reality information acquisition vehicle, and $$t_{gps2}^{gps}$$

is a GPS reception delay time at acquisition equipment of the target vehicle.

14. The virtual sensor verification system of claim 8, wherein the virtual road is a road that simulates a real road in a virtual space.

15. The virtual sensor verification system of claim 8, wherein a simulator is a tool for testing an autonomous driving algorithm through the reality information acquisition vehicle.

\* \* \* \* \*